United States Patent [19]

Wildhaber

[11] 4,092,836

[45] June 6, 1978

[54] FLEXIBLE-DISK COUPLINGS

[76] Inventor: Ernest Wildhaber, 124 Summit Dr., Rochester, N.Y. 14620

[21] Appl. No.: 798,839

[22] Filed: May 20, 1977

Related U.S. Application Data

[63] Continuation-in-part of Ser. No. 739,255, Nov. 5, 1976, Pat. No. 4,079,598, and Ser. No. 695,205, Jun. 11, 1976, Pat. No. 4,044,571.

[51] Int. Cl.² ............................................. F16D 3/78
[52] U.S. Cl. ................................. 64/13; 64/27 L; 64/15 B
[58] Field of Search ............... 64/13, 272, 15 B, 27 B, 64/14

[56] References Cited

U.S. PATENT DOCUMENTS

| | | | |
|---|---|---|---|
| 1,322,087 | 11/1919 | Bogert | 64/13 |
| 1,445,272 | 2/1923 | Gill | 64/13 |
| 1,460,212 | 6/1923 | Olive | 64/13 |
| 1,947,052 | 2/1934 | Lack | 64/13 |
| 2,855,767 | 10/1958 | Ahlen | 64/13 |
| 3,759,063 | 9/1973 | Bendall | 64/13 |
| 3,808,837 | 5/1974 | Anderson | 64/15 R |
| 3,837,178 | 9/1974 | Hackforth | 64/13 |
| 3,988,907 | 11/1976 | Bohm | 64/11 R |
| 4,044,571 | 8/1977 | Wildhaber | 64/27 L |

*Primary Examiner*—Benjamin W. Wyche
*Assistant Examiner*—R. C. Turner

[57] ABSTRACT

The disks of this coupling converge towards the outside in a way to minimize the bending stresses in general, and especially when the coupling axes intersect at an angle, kept quite small. The bending stresses are kept approximately equal at the outside end and at the inside end of the working portion of the disks. This is attained with the disk shape. Opposite disk profiles of axial sections have general directions or mean tangents that intersect in the average at a radius double their mean radius, and more generally at a radius from the disk axis between (2 + ⅛) and (2 − ⅛) said mean radius.

6 Claims, 10 Drawing Figures

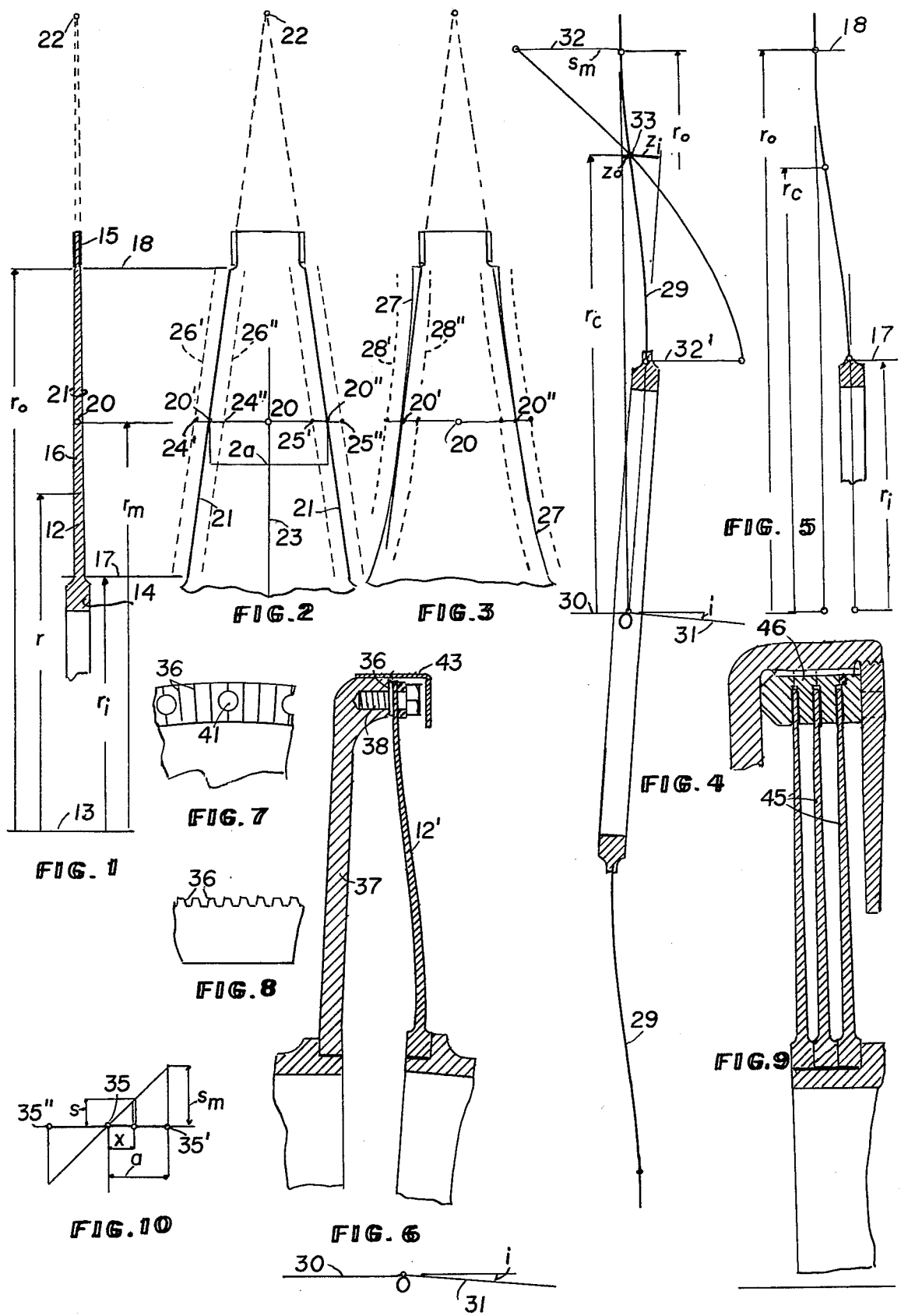

FLEXIBLE-DISK COUPLINGS

The present application is a continuation in part of my patent applications "Flexible-Disk Coupling", filed Nov. 5, 1976, Ser. No. 739,255, now U.S. Pat. No. 4,079,598 and "Flexing-Disk Coupling", filed Jun. 11, 1976, Ser. No. 695,205, now U.S. Pat. No. 4,044,571.

The couplings are mostly used in pairs.

The disk stresses are composites of three basic cases:

(1) The axes of the two coupling members intersect at a point contained in the mid-planes of the disks.
(2) A purely axial displacement of the aligned coupling members.
(3) Centrifugal stresses through high-speed rotation.

The stresses in case (1) change during a revolution and reverse themselves in each half-turn. The stresses in cases (2) and (3) change very slowly and can be larger without ill effect.

The invention will be described with reference to the drawings, in which

FIG. 1 is a fragmentary axial section of a disk with straight profile, with the thickness of its working portion shown somewhat exaggerated.

FIG. 2 is a similar axial section where the horizontal scale is magnified much further. It shows in dotted lines the limits claimed for the invention.

FIG. 3 is an axial disk section of concavely curved profile, having a mean curvature radius larger than ten times the outside radius of the disk, when shown in natural proportion with equal scales in horizontal and vertical directions.

FIG. 4 shows the center line of an axial disk section where the coupling axes intersect at O and form a much exaggerated angle $i$ with each other.

FIG. 5 shows the center line of an axial disk section when one coupling member is shifted along its axis relatively to its mating member.

FIG. 6 is a fragmentary axial section of a coupling corresponding to FIG. 4.

FIG. 7 is a fragmentary axial view of an outer disk portion, showing the straight radial teeth for connecting it with matching teeth of a coupling member to provide a radially expandable connection.

FIG. 8 is a fragmentary and much enlarged radial view of said teeth on the disk.

FIG. 9 is an axial section similar to FIG. 6, having a plurality of closely adjacent flexible disks. The coupling axes are shown in alignment.

FIG. 10 is an enlarged diagram showing the bending stresses in a disk section and providing the basis for computation.

Disk 12 shown in FIG. 1 in its undeformed state, has an axis 13, a hub portion 14 to secure it to one coupling member, an outer projection 15 for connecting it to the other coupling member of the pair, and an intermediate working portion 16 between lines 17 and 18. These have radii $r_i$ and $r_o$ respectively. Mean point 20 bisects the distance between lines 17 and 18, so that its radial distance from the disk axis amounts to $r_m = \frac{1}{2}(r_i + r_o)$. Opposite straight profiles 21 intersect at 22 when extended, at a distance $r_m$ from point 20 and at a distance $2 r_m$ from the disk axis 13. The meaning of this shape will be demonstrated later.

Mean point 20 is midway of the disk thickness $2a$ shown better in FIG. 2. $2a = 20'-20''$. Points 20', 20'' are each a distance $a$ away from central disk plane 23. Points 24', 24'' of the same radius $r_m$ are each $\frac{1}{4}$ a away from point 20'. Similarly points 25', 25'' have the same distance $\frac{1}{4}$ a from point 20''. These points and the dotted lines 26', 26'' define the range claimed for the present invention. Opposite dotted lines of equal distance from central point 20 intersect at a distance $1\frac{1}{4} r_m$ and $\frac{3}{4} r_m$ respectively from point 20. The dotted profiles shown have a constant distance, respectively, from opposite straight profiles 21. They may have somewhat varying inclinations, but extend within the space provided by the dotted lines on each side of the central plane 23.

FIG. 3 is similar to FIG. 2 in general profile direction. However it shows a concavely curved profile 27 tangent at mean points 20', 20'' to the straight-line profiles shown in FIG. 2. Dotted lines 28', 28'' again define the range of the protection claimed. They have a constant axial distance of $\frac{1}{4}$ a from profile 27.

FIG. 4 shows the deflected center line 29, with much exaggeration, of a coupling disk in an axial plane containing the coupling axes 30, 31 that intersect at O. The extension of this center line passes through O. The working portion of the disk extends between the parallel axial lines 32, 32'. It deflects increasingly with increasing angle $i$ included between the axes 30, 31. The outer portion of center line 29 is curved in one direction, while its inner portion is oppositely curved. The two portions join at the point of inflection 33, where the center line has no curvature. Point 33 has a radial distance $r_c$ from O. Here the disk transmits a force only, while at other radii a moment is added. At any sector with radius $r$, where tapered opposite straight sides passing through O include a very small angle with each other, the moment transmitted within the working portion is proportional to the radial difference $(r_c - r)$ and to the force p at point 33. The determination of $r_c$ will be outlined later.

FIG. 10 illustrates the stresses created by said moment. $2a$ is the disk thickness at radius $r$. The stress $s$ increases from zero at 35 to $s_m$ at the outside profile ends 35', 35''. At a distance $x$ from center point 35 the stress $s$ amounts to $s_m \cdot (x/a)$. The moment transmitted per peripheral unit distance is made up of the aggregate or integral of the elements $$\left(s_m \cdot \frac{x \cdot dx}{a}\right) \cdot x$$

on each side of point 35. It amounts to $2s_m \cdot (a^2/3)$ per width 1. Per width $r \cdot \text{arc } d\alpha$ it is $$2s_m \cdot \frac{a^2}{3} r \cdot \text{arc } d\alpha = p \cdot \text{arc } d\alpha \cdot (r_o - r).$$

Hence $$s_m = \frac{1\frac{1}{2} p}{a^2} \cdot \frac{(r_o - r)}{r} \qquad (a)$$

The largest stress $s_m$ is generally at the largest radius $r_o$ of the disk working-surface.

FIG. 4 shows this bending stress $s_m$ plotted as horizontal distances from center line 29, for a preferred disk-thickness distribution of (A)

$$2a = 2a_m \cdot (r_m/r) \qquad (b)$$

$2a_m$ is the disk thickness at a mean computation radius $r_m$ while $2a$ is the thickness at any other radius $r$. The stress $s_m$ at the inside end of the disk working portion, at radius $r_i$, is seen to be almost the same as at its outside radius $r_o$.

We shall compare later this showing with that of a widely used thickness distribution (B), where $$2a = 2a_m \cdot (r_m/r)^2 \qquad (c)$$

Here the disks are more tapered and their profiles are more concavely curved than in (A).

After completing a discussion of (1), where the coupling axes intersect, case (2) will be discussed, describing relative displacement of the coupling members along coinciding axes. The centrifugal stresses at high-speed rotation, case (3), however show no material difference between cases (A) and (B), provided that the connection of the flexible disk, at the outside, is radially slightly expandable, as here proposed. If the connection is rigid, the centrifugal stresses are increased.

FIG. 6 shows one half of an axial section of a coupling, or of one member of a spaced coupling pair. It illustrates with exaggeration a disk 12' having the center line 29 shown in FIG. 4. In its undeflected state it is similar to disk 12 shown in FIG. 1, but may have either straight or concavely curved side profiles. Disk 12' is secured to the coupling member with axis 31 as by welding.

At its outside the illustrated disk end contains radial teeth 36 shown in FIGS. 7 and 8. These teeth engage mating teeth provided on an element 37 that is part of the mating coupling member with axis 30. The teeth are kept in engagement by screws 38 that thread into the element 37 and reach through holes 41 of the coupling disk 12'. These holes are somewhat larger than the screws passing through them, to allow for slightly different expansion between the disk end and element 37. Also means are provided to limit the pressure of the screws with resilient washers and stops for the screws. The advance of the screws may be stopped by the tapered end of the engaged bores.

To avoid excessive air currents caused by the fast rotation of the coupling I may secure a protective sheet 43 to the outside of the coupling member.

Instead of radial teeth 36 I may also use rubber-like layers referred to hereafter.

FIG. 9 is a fragmentary axial section of a coupling with multiple disks 45 of the type described and defined. Except for the specific disk proportions this coupling is similar to the couplings shown in FIG. 1 and FIG. 6 of the patent application Ser. No. 695,205 above noted. The outside ends of the disks 45 are connected with ring-shaped parts 46, that reach between them, through rubber-like layers. These also provide radially expandable connections of a slight amount, sufficient for the purpose. The parts 46 are rigidly secured to the coupling member shown at the left.

Equation (a) defines the bending stress $s_m$ at point 35' of FIG. 10, and the opposite bending stress at point 35". Each of these points is offset from central point 35 by distance $a$, half the width of the disk there. At 35' the disk profile stretches by $(s_m/E) \cdot dr$ per radial increment $dr$. E denotes the modulus of elasticity. At 35" the disk profile is compressed. Central point 35 shows no stretching or compression. Accordingly sections apart by $dr$ include an angle $(s_m \cdot dr)/(E \cdot a)$. Introducing $s_m$ from (a), the angular change $dt$ per radial change $dr$ is $$\frac{dt}{dr} = \frac{12 p}{E \cdot (2a)^3} \cdot \frac{r_o - r}{r} ; \qquad (d)$$

The inclination $t$ is found by integration, with the addition of a constant so determined that $t$ is zero for $r = r_o$ in the coordinate system based on the outer member; and for $r = r_i$ in the coordinate system based on the coupling member that holds the inmost part of the flexible disk.

The computation for the coupling members (A), with $2a$ according to equation (b) will now be described for intersecting coupling axes, (1). Equation (d) then becomes $$\frac{dt}{dr} = \frac{12 p \cdot (r_o \cdot r^2 - r^3)}{E \cdot (2 a_m \cdot r_m)^3}$$

and with $$Q = \frac{p}{E \cdot (2 a_m \cdot r_m)^3}$$

the inclination $t$ of the disk center-line becomes $t = Q \cdot (4 r_c \cdot r^3 - 3 r^4) + $ a constant, to keep $t$ zero at $r_i$ and $r_o$ respectively, Hence $t = Q \cdot [(4 r_c \cdot r^3 - 3 r^4) - (4 r_c \cdot r_i^3 - 3 r_i^4)]$; inner part $t = Q \cdot [(4 r_c \cdot r^3 - 3 r^4) - (4 r_c \cdot r_o^3 - 3 r_o^4)]$; outer part The inclination $i$ between the axes of the two coupling members is $i = t_i - t_o$. In radian measure $t_i$ and $t_o$ are at the point 33 of inflection (FIG. 4), with radius $r_c$:

$t_i = Q \cdot [r_c^4 - (4 r_c \cdot r_i^3 - 3 r_i^4)]$; inner part $t_o = Q \cdot [r_c^4 - (4 r_c \cdot r_o^3 - 3 r_o^4)]$; outer part The point of inflection 33 has a distance $z_i$ from the plane perpendicular to axis 31, laid through the intersection point O of the axes 30, 31. And it has a distance $z_o$ from the plane through O perpendicular to axis 30.

$$z_i = \int_{r_i}^{r_o} t \cdot dr = Q \, [r_o^5 - 0.6 \, r_o^5 - r_o \cdot r_i^4 + 0.6 \cdot r_i^5$$
$$- r_i(4 \, r_o \cdot r_i^3 - 3 \, r_i^4) + r_i(4 \, r_o \cdot r_i^3 - 3 \, r_i^4)]$$
$$= Q \, [0.4 \, r_o^5 - 2.4 \, r_i^5 + 6 \, r_o \cdot r_i^4 - 4 \, r_o^2 \cdot r_i^3]$$

$$z_o = \int_{r_o}^{r_o} t \cdot dr =$$
$$Q \, [-0.4 \, r_o^5 + 2.4 \, r_o^5 - 6 \, r_o \cdot r_o^4 + 4 \, r_o^2 \cdot r_o^3]$$

$(z_i + z_o) =$
$Q \, [2.4(r_o^5 - r_i^5) - 6 \, r_o(r_o^4 - r_i^4) + 4 \, r_o^2(r_o^3 - r_i^3)]$
$= r_o \cdot \text{arc } i \quad$ (angle i in radian measure)

Also $r_c \cdot \text{arc } i = r_c(t_i - t_o) = Q \, [4 \, r_c^2(r_o^3 - r_i^3) - 3 \, r_c(r_o^4 - r_i^4)]$ Hence $3 \, r_c(r_o^4 - r_i^4) = 2.4(r_o^5 - r_i^5)$ $$r_c = 0.8 \, \frac{(r_o^5 - r_i^5)}{(r_o^4 - r_i^4)} \; ; \; \frac{r_c}{r_o} = 0.8 \, \frac{1 - (\frac{r_i}{r_o})^5}{1 - (\frac{r_i}{r_o})^4}$$

$$\frac{r_c}{r_o} = 0.8188 \text{ for } \frac{r_i}{r_o} = 0.45$$

Also arc $i = Q \cdot r_o^4 \cdot 0.09982$ for $r_i/r_o = 0.45$
With $a = (a_m \cdot r_m)/r$ we get from equation (a)

$$s_m = \frac{1\frac{1}{2} p}{(a_m \cdot r_m)^2} (r - r_c) \cdot r$$

The bending stress $s_{mo}$ at the outside of the working portion of the disk, and the bending stress $s_{mi}$ at its inside are then $$s_{mo} = \frac{1\frac{1}{2} p \, r_o^2}{(a_m \cdot r_m)^2} (1 - \frac{r_c}{r_o}); =$$

$$\frac{1\frac{1}{2} p \, r_o^2}{(a_m \cdot r_m)^2} \cdot 0.1812 \text{ for } \frac{r_i}{r_o} = 0.45$$

$$-s_{mi} = \frac{1\frac{1}{2} p \, r_o^2}{(a_m \cdot r_m)^2} \left[ (\frac{r_i}{r_o})^2 - \frac{r_c}{r_o} (\frac{r_i}{r_o}) \right]; =$$

$$\frac{1\frac{1}{2} p \, r_o^2}{(a_m \cdot r_m)^2} \cdot 0.1660 \, (-) \text{ for } \frac{r_i}{r_o} = 0.45$$

It should be noted that the stresses $s_{mo}$ and $s_{mi}$ are numerically almost equal.

(B) The described design (A) shall now be compared with a different design that is widely used. Its disk thickness is defined by equation (c). From (d)

$$\frac{dt}{dr} = \frac{12 \, p}{E \cdot (2a_m \cdot r_m)^3 \cdot r_m^3} \cdot (r_o \cdot r^5 - r^6) =$$

$$\frac{12 \, Q}{r_m^3} (r_o \cdot r^5 - r^6)$$

$$t = \frac{Q}{r_m^3} \cdot (2 \, r_o \cdot r^6 - \frac{12}{7} \cdot r^7) + \text{a constant}$$

Proceeding as before we obtain $$r_c = \frac{7}{8} \, \frac{(r_o^8 - r_i^8)}{(r_o^7 - r_i^7)};$$

$$\frac{r_c}{r_o} = 0.8768 \text{ for } \frac{r_i}{r_o} = 0.45$$

$$s_m = \frac{1\frac{1}{2} p}{(a_m \cdot r_m^2)^2} \cdot (r^4 - r_o \cdot r^3) \text{ here and hereafter}$$

$$s_{mo} = \frac{1\frac{1}{2} p \, r_o^2}{(a_m \cdot r_m)^2} \cdot (\frac{r_o}{r_m})^2 \cdot (1 - \frac{r_c}{r_o}) = \frac{1\frac{1}{2} p \cdot r_o^2}{(a_m \cdot r_m)^2} \cdot 0.2344$$

$$i = t_i - t_o = 2 \, (\frac{r_o}{r_m})^3 \cdot Q \cdot r_o^4$$

$$\left[ \frac{r_o}{r_o} \left\{ 1 - (\frac{r_i}{r_o})^6 \right\} - \frac{6}{7} \left\{ 1 - (\frac{r_i}{r_o})^7 \right\} \right]$$

$$i = Q \cdot r_o^4 \cdot 0.081788$$

It compares with $Q \cdot r_o^4 \cdot 0.099816$ in (A), at the same pressure $p$. At the same shaft angle $i$ as in (A) the bending stress is increased $0.099816/0.081788 = 1.2204$ times over 0.2344 to 0.2860. This is 157.9% of the figure for (A). The smaller 100% bending stress of (A) makes for higher capacity.

(2) Next purely axial displacement of coaxial coupling members will be described. FIG. 5 shows a deflected disk in axial section. All axial sections are alike. Retaining the symbols used before, $r_c$ is the radius to the point of inflection of the disk center-line. $2a_m$ is the disk thickness at mean radius $r_m = \frac{1}{2}(r_o + r_i)$ of the working portion of the disk. $s_m$ is the maximum bending stress. $z$ is the axial separation of the mating coupling members.

The maximum bending stress $s_m$ at any disk radius $r$ is as described in connection with FIG. 10, with $P/2\pi$ substituted for $p$. $P$ is the total axial pressure applied to one coupling member $$s_m = \frac{1\frac{1}{2} P (r_c - r)}{2\pi a^2 \quad r} \tag{a'}$$

$$\frac{dt}{dr} = \frac{s_m}{E \cdot a} = \frac{12 \, P}{2\pi E \cdot (2a)^3} \cdot \frac{(r_c - r)}{r}$$

$dt/dr$ becomes zero at the point of inflection with radius $r_c$. For (A)

$$a = \frac{a_m \cdot r_m}{r}, \text{ and with}$$

$$Q' = \frac{P}{2\pi E \cdot (2 \, a_m \cdot r_m)^3}$$

$$\frac{dt}{dr} = 12 \, Q' \cdot (r_c \cdot r^2 - r^3)$$

Inclination $t$ is again obtained by integration. It is the inclination of the central disk curve to the radial direction.

$$t = Q'(4 \, r_c \cdot r^3 - 3 \, r^4) + \text{a constant} \quad \text{for (A)}$$

$t_c$ is said inclination at the point of inflection. At this point the inner and outer branches of the central disk curve join with a common tangent. $t_c$ of both branches are equal. Angle $i$ of the basic case (1) is zero, in (2).

$$t_c = Q' \cdot [r_c^4 - (4 \, r_c \cdot r_i^3 - 3 \, r_i^4)] = Q' \cdot [r_c^4 - (4 \, r_c \cdot r_o^3 - 3 \, r_o^4)]$$

Hence $$4 \, r_c (r_o^3 - r_i^3) = 3 \, (r_o^4 - r_i^4)$$

$$r_c = \frac{3}{4} \, \frac{(r_o^4 - r_i^4)}{(r_o^3 - r_i^3)}$$

$$\frac{r_c}{r_o} = 0.79136$$

The axial displacement $$z = \int_{r_i}^{r_c} t \cdot dr + \int_{r_c}^{r_o} t \cdot dr$$

$$z = Q' \cdot r_o^5 \left[ 2.4 \left\{ 1 - (\frac{r_i}{r_o})^5 \right\} - 6 (\frac{r_c}{r_o}) \cdot \right.$$

$$\left. \left\{ 1 - (\frac{r_i}{r_o})^4 \right\} + 4 (\frac{r_c}{r_o})^2 \left\{ 1 - (\frac{r_i}{r_o})^3 \right\} \right]$$

$$z = Q' \cdot R_o^5 \cdot 0.07899 \text{ for } \frac{r_i}{r_o} = 0.45$$

With $$G = \frac{1\frac{1}{2} P}{2\pi} \cdot \frac{r_o^2}{(a_m \cdot r_m)^2}$$

the bending stresses $s_{mo}$ at $r_o$ and $s_{mi}$ at $r_i$ are:

$$s_{mo} = G \left(1 - \frac{r_c}{r_o}\right) \text{ and } s_{mi} = G \cdot \left(\frac{r_i}{r_o}\right)^2 \cdot \frac{r_c - r_i}{r_i}$$

$$= G \cdot 0.2086 \text{ and } G \cdot 0.1536 \text{ for } \frac{r_i}{r_o} = 0.45$$

For (B)

$$a = a_m \left(\frac{r_m}{r}\right)^2$$

$$\frac{dt}{dr} = \frac{12 \, Q'}{r_m^3} \cdot (r_c \cdot r^5 - r^6)$$

$$t = Q' \left(2 r_c \cdot r^6 - \frac{12}{7} \cdot r^7\right)/r_m^3 + \text{a constant}$$

$$t_c = \frac{Q'}{r_m^3} \left[\frac{2}{7} r_c^7 - (2 r_c r_i^6 - \frac{12}{7} r_i^7)\right] =$$

$$\frac{Q'}{r_m^3} \left[\frac{2}{7} r_c^7 - (2 r_c r_o^6 - \frac{12}{7} r_o^7)\right]$$

Hence $$2 r_c (r_o^6 - r_i^6) = \frac{12}{7} (r_o^7 - r_i^7)$$

$$r_c = \frac{6}{7} \cdot \frac{r_o^7 - r_i^7}{r_o^6 - r_i^6} ; \frac{r_c}{r_o} = 0.86109 \text{ for } \frac{r_i}{r_o} = 0.45$$

$$z = \frac{1}{7} \left(\frac{r_o}{r_m}\right)^3 \cdot (Q' \cdot r_o^5) \left[10\tfrac{1}{2}\left\{1 - \left(\frac{r_i}{r_o}\right)^8\right\}\right.$$

$$\left. - 24 \frac{r_c}{r_o}\left\{1 - \left(\frac{r_i}{r_o}\right)^7\right\} + 14 \left(\frac{r_c}{r_o}\right)\left\{1 - \left(\frac{r_i}{r_o}\right)^6\right\}\right]$$

$$z = Q' \cdot r_o^5 \cdot 0.070427$$

$$s_{mo} = G \cdot \left(\frac{r_o}{r_m}\right)^2 \cdot \left(1 - \frac{r_c}{r_o}\right) = G \cdot 0.2643$$

$s_{mo} = 142 \%$ of (A) at the same axial displacement of z.

Embodiment (A) proposed here has been mathematically shown to have smaller stresses than (B) under equal conditions. (1) When the two coupling shafts intersect at an angle (i) the stress level in (B) is around 158% to 100% in (A). (2) For equal coaxial displacements of the two coupling members relatively to one another, the stress level in (B) is around 142% to 100% in (A). These figures are based on an inside diameter of 45% the outside diameter of the working surface of the disks.

Axial relative displacements especially may occur in a relatively ample degree. The actual displacements are combinations of both.

In both (1) and (2) the largest stresses occur at the outside circle of the working surface of the disk. Here the disk thickness is larger in (A) than in (B). This may be the reason for the better showing of (A). Also the disks of (A) are less delicate.

I claim:

1. A flexible-disk coupling containing at least one disk decreasing in thickness towards the outside and connected at the inside to a rotary part and at the outside to a mating rotary part, whereby the straight lines that pass through the mean points of opposite disk profiles in the directions of said profiles, intersect at distances from the said points between $(1 + \tfrac{1}{4})$ and $(1 - \tfrac{1}{4})$ times the radial distance of said points from the disk axes.

2. A flexible-disk coupling according to claim 1, wherein in the unstressed state the sides of the working portion of a disk are conical surfaces with straight profiles in axial sections.

3. A flexible disk-coupling according to claim 1, wherein the disk sides have concavely curved profiles in axial sections, the curvature radius of said profiles being larger than ten times the outside radius of the disk.

4. A flexible disk-coupling according to claim 1, containing a disk whose outer end portion has a radially expandable connection with one of said two rotary parts.

5. A flexible disk-coupling according to claim 4, wherein the outer periphery of said disk contains radial teeth on at least one of its sides, that engage mating radial teeth provided on portions rigid with one of said two rotary parts.

6. A flexible disk-coupling according to claim 4, wherein the outer periphery of said disk is connected to a portion rigid with one of said two rotary parts through rubber-like sheet means.

* * * * *